(12) United States Patent
Curtis et al.

(10) Patent No.: US 8,370,825 B2
(45) Date of Patent: Feb. 5, 2013

(54) PROGRAM-UPDATE PRIORITIZATION ACCORDING TO PROGRAM-USAGE TRACKING

(75) Inventors: James Russell Curtis, Placerville, CA (US); Bruce Neil Campbell, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2181 days.

(21) Appl. No.: 10/691,028

(22) Filed: Oct. 22, 2003

(65) Prior Publication Data

US 2005/0091651 A1 Apr. 28, 2005

(51) Int. Cl.
*G06F 9/44* (2006.01)
*G06F 9/445* (2006.01)

(52) U.S. Cl. ......... 717/168; 717/127; 717/169; 717/174

(58) Field of Classification Search ............... 717/160
See application file for complete search history.

(56) References Cited

U.S. PATENT DOCUMENTS

| | | | | |
|---|---|---|---|---|
| 6,141,010 | A * | 10/2000 | Hoyle | 715/854 |
| 6,192,403 | B1 * | 2/2001 | Jong et al. | 709/224 |
| 6,553,507 | B1 * | 4/2003 | Cohen | 714/4 |
| 6,678,888 | B1 * | 1/2004 | Sakanishi | 717/172 |
| 6,742,033 | B1 * | 5/2004 | Smith et al. | 709/224 |
| 6,763,403 | B2 * | 7/2004 | Cheng et al. | 710/36 |
| 7,016,944 | B1 * | 3/2006 | Meyer et al. | 709/218 |
| 7,512,940 | B2 * | 3/2009 | Horvitz | 717/173 |
| 7,665,069 | B2 * | 2/2010 | Weber | 717/127 |
| 7,707,573 | B1 * | 4/2010 | Marmaros et al. | 717/178 |
| 2002/0026631 | A1 * | 2/2002 | Barritz | 717/127 |
| 2003/0191730 | A1 * | 10/2003 | Adkins et al. | 706/47 |
| 2003/0217357 | A1 * | 11/2003 | Parry | 717/168 |
| 2004/0003266 | A1 * | 1/2004 | Moshir et al. | 713/191 |
| 2004/0098421 | A1 * | 5/2004 | Peng | 707/203 |
| 2004/0117784 | A1 * | 6/2004 | Endoh | 717/169 |
| 2004/0133445 | A1 * | 7/2004 | Rajan et al. | 705/1 |
| 2004/0210889 | A1 * | 10/2004 | Childress et al. | 717/168 |
| 2004/0255290 | A1 * | 12/2004 | Bates et al. | 717/174 |
| 2005/0108687 | A1 * | 5/2005 | Mountain et al. | 717/127 |
| 2005/0177825 | A1 * | 8/2005 | Kamalanathan | 717/168 |

OTHER PUBLICATIONS

Burak et al., Analyzing usage of location based services, Apr. 2003, 2 pages, <http://delivery.acm.org/10.1145/770000/766100/p970-burak.pdf>.*
Sow et al., Prefetching based on web usage mining, Jun. 2003, 20 pages, <http://delivery.acm.org/10.1145/1520000/1515934/p262-sow.pdf>.*
Mobasher et al., Automatic personalization based on Web usage mining, Aug. 2000, 10 pages, <http://delivery.acm.org/10.1145/350000/345169/p142-mobasher.pdf>.*
Sample update download page from Microsoft, Oct. 21, 2003.

* cited by examiner

*Primary Examiner* — Thuy Dao

(57) ABSTRACT

An update website prioritizes updates available for an application (e.g., a word-processing program or a fault-tolerance program) running on a user computer system. Prioritization is in part a function of usage data gathered on the user computer system by a usage-tracking module of the application. The usage data is transferred to the update site and parameters relevant to prioritization are evaluated. The parameter values are then used for prioritization. The usage data can also be compiled with data from other users to guide further development of the application.

8 Claims, 2 Drawing Sheets

PROGRAM-UPDATE PRIORITIZATION ACCORDING TO PROGRAM-USAGE TRACKING

BACKGROUND OF THE INVENTION

The present invention relates to computer software and, more particularly, to updating computer software. A major objective of the invention is to provide for more customized update selection.

As computers have become pervasive in our society, computer software manufacturers compete aggressively for market share. For many, the objective is to get more features to the marketplace ahead of competitors. Of course, competition does not cease with the sale of a software product, as a competitor may subsequently introduce a competitive product with even more features. Newer versions with greater features sets are constantly being developed. To maintain customer loyalty between major version introductions, many computer manufacturers provide free or reduced-cost upgrades so that a purchaser can benefit from ongoing product development.

Modem software programs can be too complex for thorough testing. Even if software is thoroughly tested on one hardware configuration, it can be difficult to validate its performance on all possible hardware configurations on which it might be installed. Furthermore, it can be infeasible to test it with all possible software configurations (operating system versions and other software) that might be applicable. Given the time pressure for product introductions, it is not surprising that program defects and program incompatibilities are common.

As program defects and incompatibilities are discovered in purchased software, the manufacturer may create and distribute, usually at no cost to owners of the software, patches to address these problems. Herein, a "patch" is software that fixes or replaces existing software without adding new features, while an "upgrade" is software that adds new features and may or may not address defects and incompatibilities. "Patches" and "upgrades" are collectively referred to herein as "program updates" or more succinctly as "updates".

Commonly, updates are made available on the Internet (e.g., on a website run by the software manufacturer). Users can then download and install updates from the website. Sometimes problems arise after update installation-e.g., compatible software is no longer compatible. As a result, many users decline updates or do not bother to check on their availability. For this and other reasons, the number of available updates for a software program can grow to be unwieldy—e.g., there can be tens of available updates for a single program. The large number of available updates can further discourage a user from updating software.

On the other hand, even a reluctant user may want to upgrade to address security issues, to add a much-desired feature, or to address incompatibilities arising from newly installed hardware or software, etc. Nonetheless, the user might not want to install all the available updates, each of which imposes some installation burden and carries with it some risk on creating an incompatibility that did not exist before the update.

In view of this situation, many software manufacturers document the advantages of each update so that a user can make a cost-benefit analysis in deciding whether or not to implement the update. Some companies rank updates by importance to help a user select which updates to install, if not all are to be installed. For example, Microsoft Corporation distinguishes "critical" and "non-critical" updates. Still, a user can be confronted with a list of tens of "critical" updates and have a difficult time determining which updates would really be beneficial. Accordingly, what is needed is a more effective system for determining which updates should be installed.

SUMMARY OF THE INVENTION

The present invention provides a system for selecting updates as a function of usage information gathered from a user. Data regarding usage is gathered on the user's computer system. During an update session, the usage data is transmitted to a vendor's computer system. The vendor's computer system analyzes the usage data to provide information to help the user select updates.

For example, the vendor system can prioritize updates and/or tailor the content or form of update-specific information according to the usage data.

A major advantage of the present invention is that update options are prioritized in a manner most relevant to the user, e.g., according to the features actually used by the user. This allows the user to install updates that are most likely to improve the usefulness of the underlying application, and thus the productivity of the user and/or the efficacy of the application. At the same time, the user is relieved of the burden and the associated risks of incompatibility involved with updates that do not enhance the value of the application to the users. Moreover, the usage data is also available to the vendor for guiding further development of the application. These and other features and advantages of the invention are apparent from the description below with reference to the following drawings.

DETAILED DESCRIPTION

Figure 1:
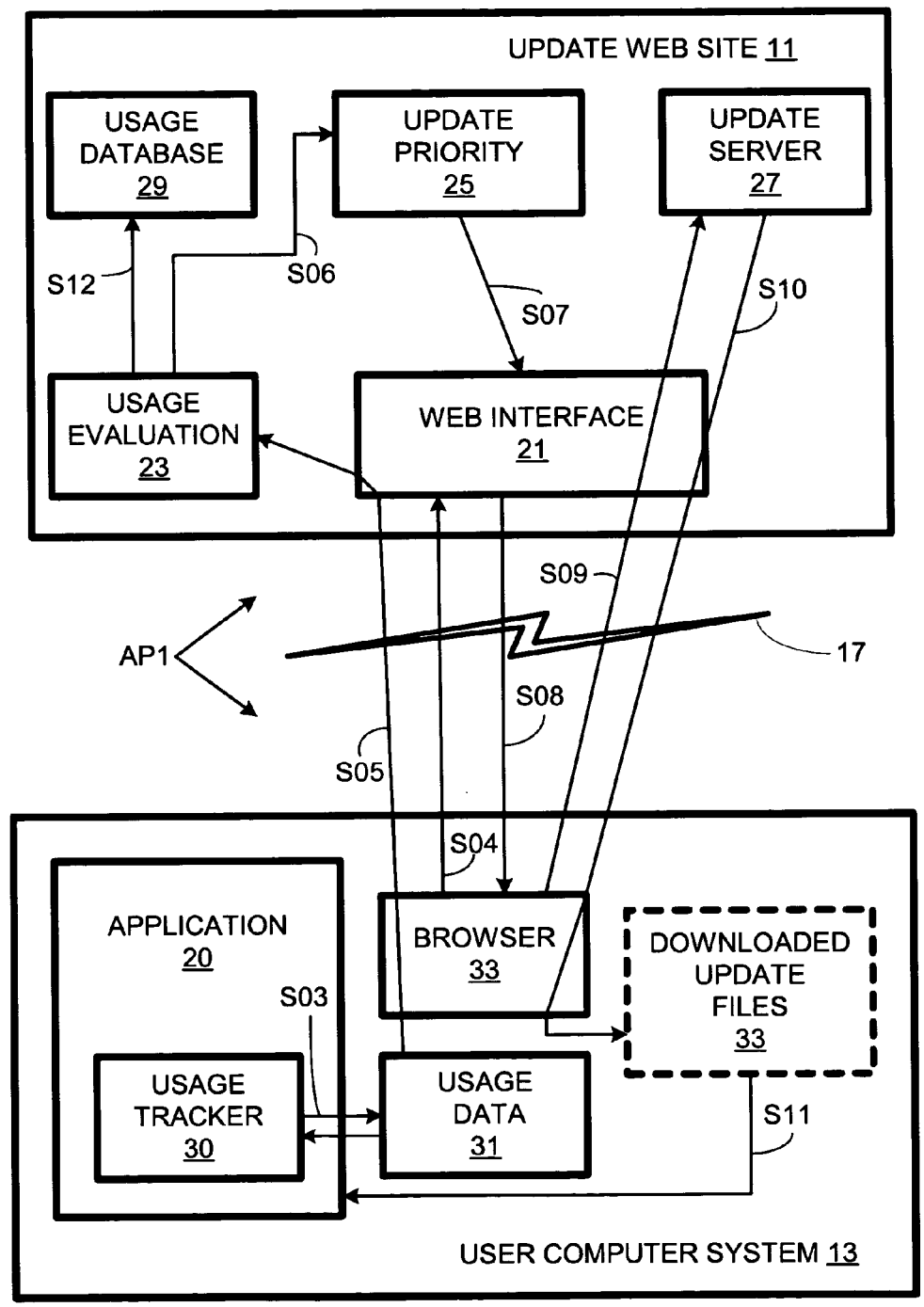
FIG. 1 is a schematic illustration of a vendor computer system and a client computer system communicating over the Internet and embodying a program set in accordance with the present invention.
Figure 2:
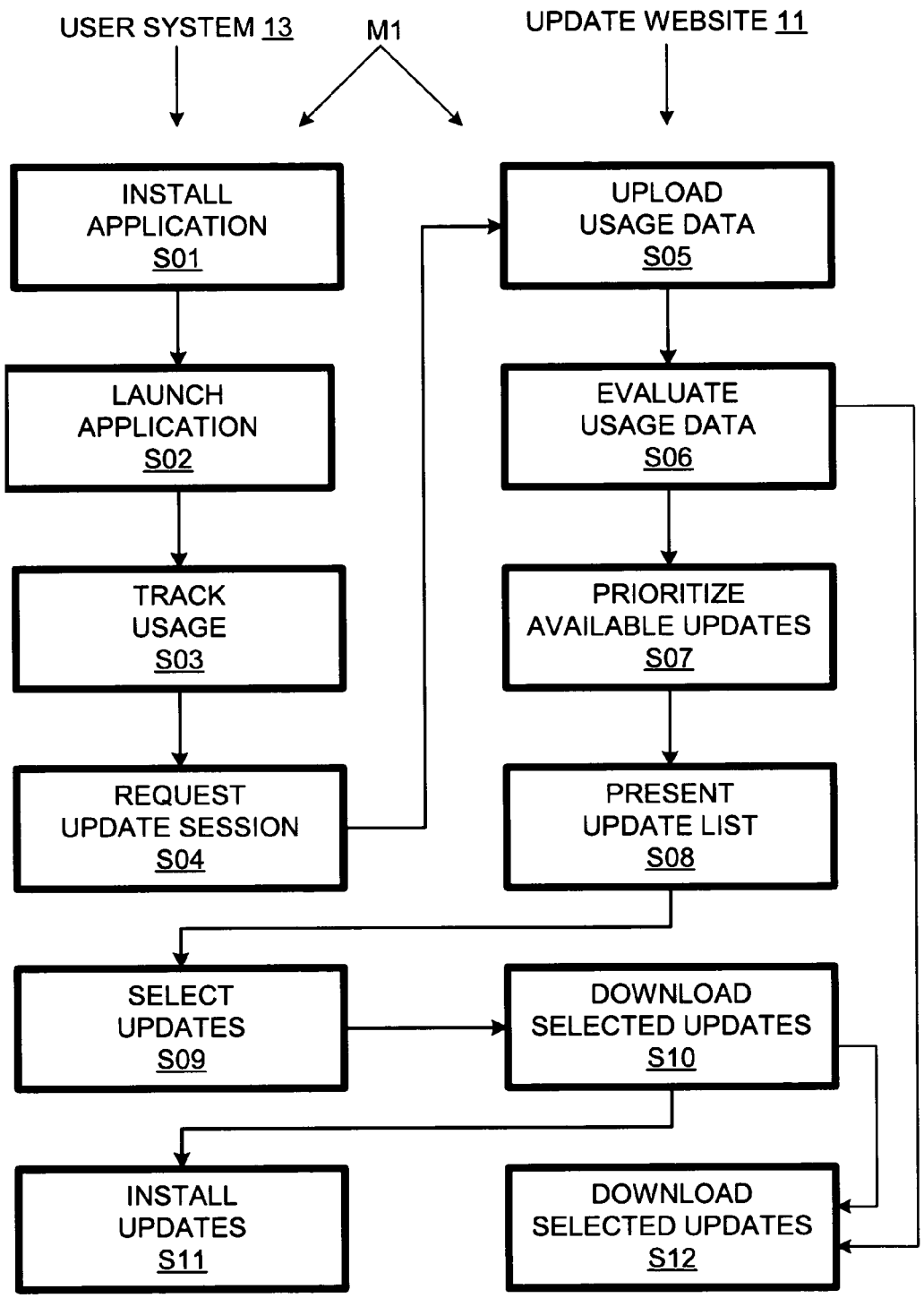
FIG. 2 is a flow chart of a method implemented by the systems of FIG. 1 in accordance with the present invention.

In accordance with the present invention, a set of software programs API distributed between an update website 11 and a user computer system 13 cooperate over the Internet 17 to provide for intelligent selection of updates for a software application 20 running on user system 13, as shown in FIG. 1. Update website 11 preferably runs on a network of computers, including servers and workstations that provide a web interface 21, a usage evaluation program 23, an update prioritizer 25, an update file server 27, and a usage database 29. While user system 13 can also be a network of computers, the focus herein is on a single user computer on which application 20 is installed.

The manufacturer for application 20 operates update website 11. Alternatively, update website 11 can be operated by a third party (i.e., other than the application developer or the user) providing support for application 20. In either case, update website 11 provides updates for application 20. In the illustrated hypothetical example, available updates for application 20 have been allowed to accumulate without downloading and installation on user system 13. While application 20 is running, an included usage-tracking function 30 generates usage data, which is stored in a usage file 31. In addition, user system 13 has a web browser 33 installed.

Application 20 can be a word processor or any other application driven primarily by user commands. Alternatively, application 20 can be a program that runs in the background, such as automatic backup and other software that minimizes the impact of hardware and software failures. In either case, application 20 includes usage-tracking function 30. Usage-tracking function 30 tracks choices made by the user and/or tasks application performs.

More specifically, it can track configuration data, command selection, and the nature of the work done with application 20. Thus, usage-tracking function 30 captures which features of the application are actually being used by a given user. In addition, usage-tracking function 30 can include information about the hardware and software environment in which application 20 is run.

In a method M1 of the invention, application 20 is installed at step S01. At step S02, the user launches application 20 (or application 20 can be launched automatically). Note that this launching can be a one time event, an occasionally event, or a daily or more frequent invent, depending on the nature of application 20.

While application 20 is running, usage-tracking function 30 tracks usage at step S03, storing usage data in file 31.

At some point during the tenure of application 20, a user may decide that an update is necessary or desirable. For example, an update may be required to address a security threat, such as a newly released virus. Alternatively, an update might be required to address an incompatibility that arose, for example, due to a change in the hardware and software environment of application 20. Accordingly, user activates browser 33 and access vendor's update website 11 at step S04.

Update website 11 uploads user data file 31 to itself at step SOS. Preferably, this is preceded by a request for permission to perform the upload. Also, the usage data file can be encrypted prior to transmission and decrypted upon reception for security purposes.

Usage data file 31 is transferred to usage-evaluation function 23 at step S06. The usage-evaluation function provides values to parameters useful for prioritizing updates. The usage pattern can be used to determine what features are important to the user, and which are not. Also, the usage pattern can distinguish beginning, intermediate, and advanced users by the features they tend to use.

The results of the evaluation are made available to update prioritizer 25.

Update prioritizer 25 orders updates applicable to the version of application 20 on user system 13 in part as a function of the evaluated usage data at step S07. It then presents prioritized update information to web interface 21 for presentation to the user of user system 13, at step S08. The user is presented with a list of applicable updates in order of estimated importance to the user. In addition, information regarding the benefits afforded by each applicable update relative to the existing version is provided in the listing to help the user to determine which update or updates to download.

The user makes a selection at step S09, which selection is presented to update server 27. Update server 27 then downloads the requested update(s) to user system 13 at step S10. The update files may be self-installing or the user may be given instructions on how to install the updates at step S1.

The installation procedure itself can be selected by the update site as a function of usage data, to the extent that data indicates whether the user is a beginner or and advanced user. If the user is a beginner, a "wizard" can guide the installation process, while an advanced user might be presented with a more efficient but less user-friendly installation procedure.

Installation of the downloaded updates completes the update procedure. However, method M1 optionally includes a step S12 provides for using the evaluated usage data (from step S06) and user selections (from steps S09 and S10) to guide further application development. User-identification data is removed from the evaluated usage data and selection data. Then the usage and selection data is combined with other usage and selection data to determine what features are most used and what updates are selected most often. This information can be used to direct further development efforts (e.g., toward the more features indicated as most popular by the usage and selection data).

The present invention provides for a wide range of alternative embodiments. The application program can be a user command driven application, such as a word processor, a spreadsheet, a database, a financial program, a web browser, or a graphics, audio or video editing program. In such cases, the user tracker can track user commands so that there relative frequency of use can be determined from usage file 33.

On the other hand, the application program can run in the background and not require much user interaction. For example, the application can be fault-tolerance or high-availability software.

High-availability software is software that minimizes down time in the case of a fault. For example, if a computer fails so that a dependent application becomes suddenly unavailable, the high-availability application launches a copy of the software on another computer in the same cluster so that customer-users are minimally impacted by the interruption. Fault-tolerant software also achieves high-availability, but also ensures that data is not lost in the event of a computer failure. For high-availability and fault-tolerant applications, usage tracking includes tracking events that trigger action. More generally, usage tracking can involve tracking configurations, commands, and triggering events.

The data file can contain data indicating what events (commands, triggering events) happen with what frequency. In addition, the application version number and configuration data can be stored. In determining the relative importance of events, recent events can be weighted more heavily than older events. A simple way to do this is to retire old events—e.g. after a certain lapse of time (e.g., 1 year) or the oldest events as a file size limit is reached. More complex methods can actually assign fractional weightings that diminish over time. Of course, the fractional weightings and retirement approaches can be combined.

The update session is typically initiated from the client computer system. However, an email or other notification from the vendor can be the stimulus to begin the update session. The session can be initiated from within the application, or more specifically the usage-tracking module; if the usage tracking is not integrated with the application, the usage-tracking program can initiate the update session with or without the application being active. Alternatively, a user can use a web browser to initiate an update session without using the application or the usage-tracking software.

Once the update site is contacted, the usage data must be transferred. The update site can initiate the transfer, or the update site can request a user to initiate the transfer. For security purposes, the latter is preferred and may be coupled with user authentication.

Once the data is transferred, the usage data is analyzed to evaluate parameters to be used in prioritizing available updates. For example, for a word-processing application, the frequency of commands relating to table formation and manipulation can be combined to determine whether the user takes advantage of the table features of the word-processing program. If table features are used a lot, an update that fixes some problem with the table commands can be given a high priority. If the table features are left unused, such an update may be given a low priority.

Once the relevant parameters are evaluated, the available updates are graded according to the parameters values. The grading may be a simple bifurcation into critical and non-critical updates. Preferably, the grading is finer, using three or more levels or even a numerical scale, e.g., from 0-100. In addition to the grading, a description is generated of the advantages provided by each prospective update relative to the installed version of the application. For example, a description for an update that addresses a table generation in a word-processing application might read: "This update adds the ability to insert rows above a cursor and fixes a problem with using multiple fonts within a table cell." In addition to prioritizing, dependencies among updates are addressed. For example, all prerequisites updates for an update are identified.

A list of prioritized updates is presented to the user. The list preferably orders the updates so that the more important updates for the given user, as determined from the usage data, are presented first, possibly along with their advantages and their prerequisite information. The list can be presented as a web page, with links to the actual update files or to a program for serving the update files. Thus, when a user clicks on an update name or icon, the associated update is downloaded to the client computer system.

The update site can initiate installation, or the update site can provide instruction to the user for update installation—or a combination of both these approaches can be used. The downloads can be self-executing files, compressed files that become self-execution when decompressed, or files that are activated using an installer program. An installer may be downloaded with the updates, be built into the usage-tracking module, or be available elsewhere on the client computer system. These and other variations upon and modifications to the detailed embodiments are provided for by the present invention, the scope of which is defined by the following claims.

What is claimed is:

1. A method comprising:
    launching an application on a user system;
    tracking usage of said application so as to generate usage data on said user system;
    accessing an update site from said user system;
    transferring said usage data from said user system to said update site;
    said update site prioritizing updates for said application at least in part as a function of said usage data; and
    said update site presenting to a user a list of said updates as prioritized in said prioritizing step.

2. A method as recited in claim 1 wherein said user selects one or more of said updates for said application.

3. A method as recited in claim 2 wherein said selected ones of said updates are installed so as to modify said application.

4. A method as recited in claim 1 wherein further development of said application is directed in part as a function of said usage data.

5. A computer program product comprising computer-readable storage media encoded with a set of computer programs including:
    a usage data evaluator for receiving and evaluating raw usage data provided by a user computer system regarding a version of a software application installed thereon, said usage data evaluator providing evaluated usage data;
    an update prioritizer for prioritizing updates available for said version at least in part as a function of said evaluated usage data; and
    a web interface for communicating with said user computer system via a browser on said user system so as to present to a user of said user computer system a list of said updates as prioritized by said prioritizer.

6. A product as recited in claim 5 wherein said web interface specifies, for at least some of said updates, advantages over said version of said application.

7. A product as recited in claim 5 further comprising a usage-tracking module installed on said user computer system.

8. A product as recited in claim 7 wherein said usage-tracking module is integrated with said version of said application.

* * * * *